G. H. LANCHESTER.
GEAR ACTUATING MECHANISM FOR MOTOR VEHICLES.
APPLICATION FILED APR. 9, 1909.
941,261.
Patented Nov. 23, 1909.
2 SHEETS—SHEET 2.
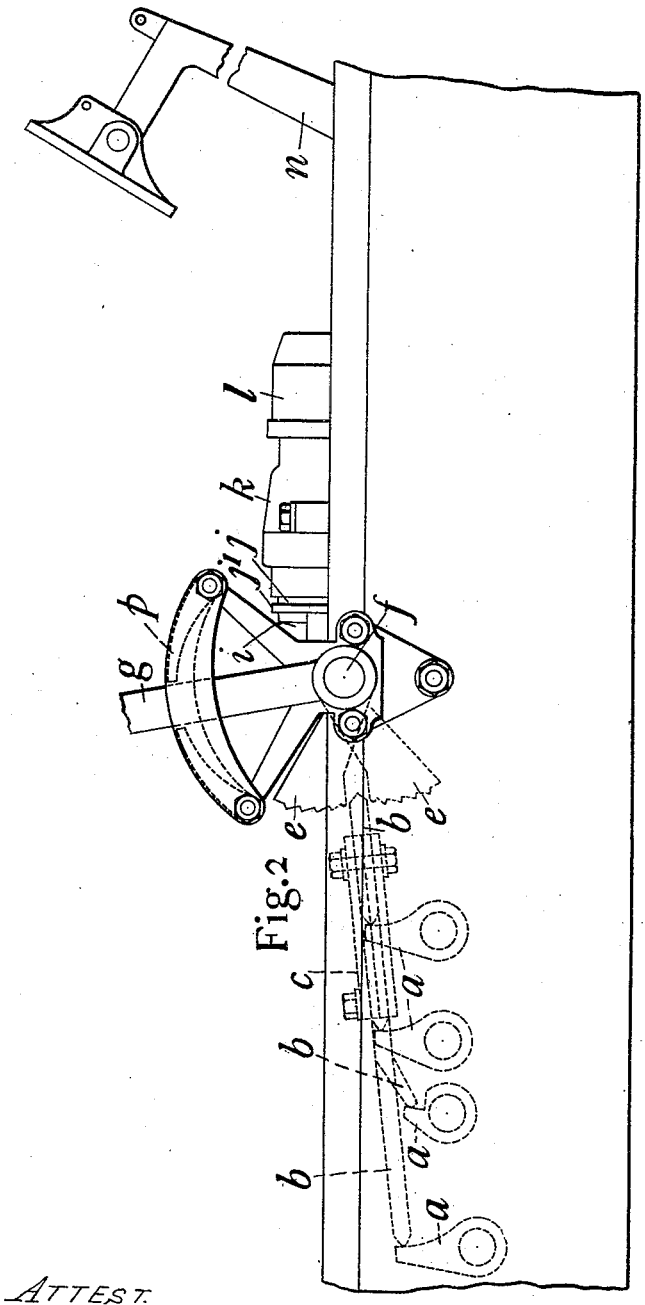
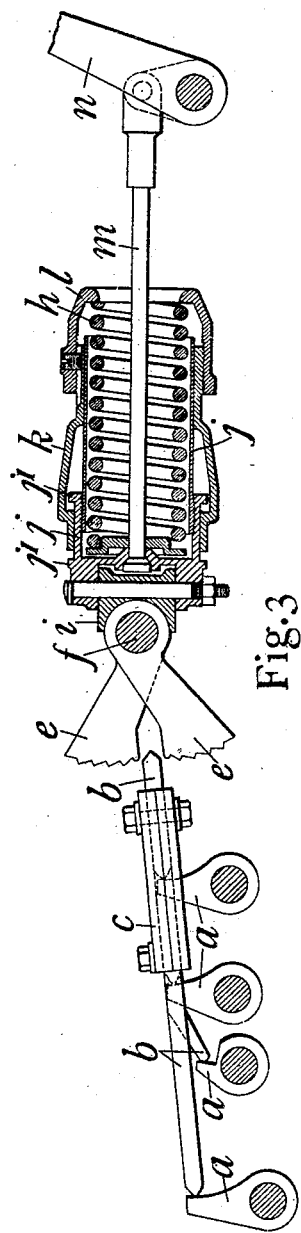
ATTEST.
Benj. M. Stahl
Ewd. L. Tolson.
INVENTOR.
GEORGE HERBERT LANCHESTER
ATTYS.

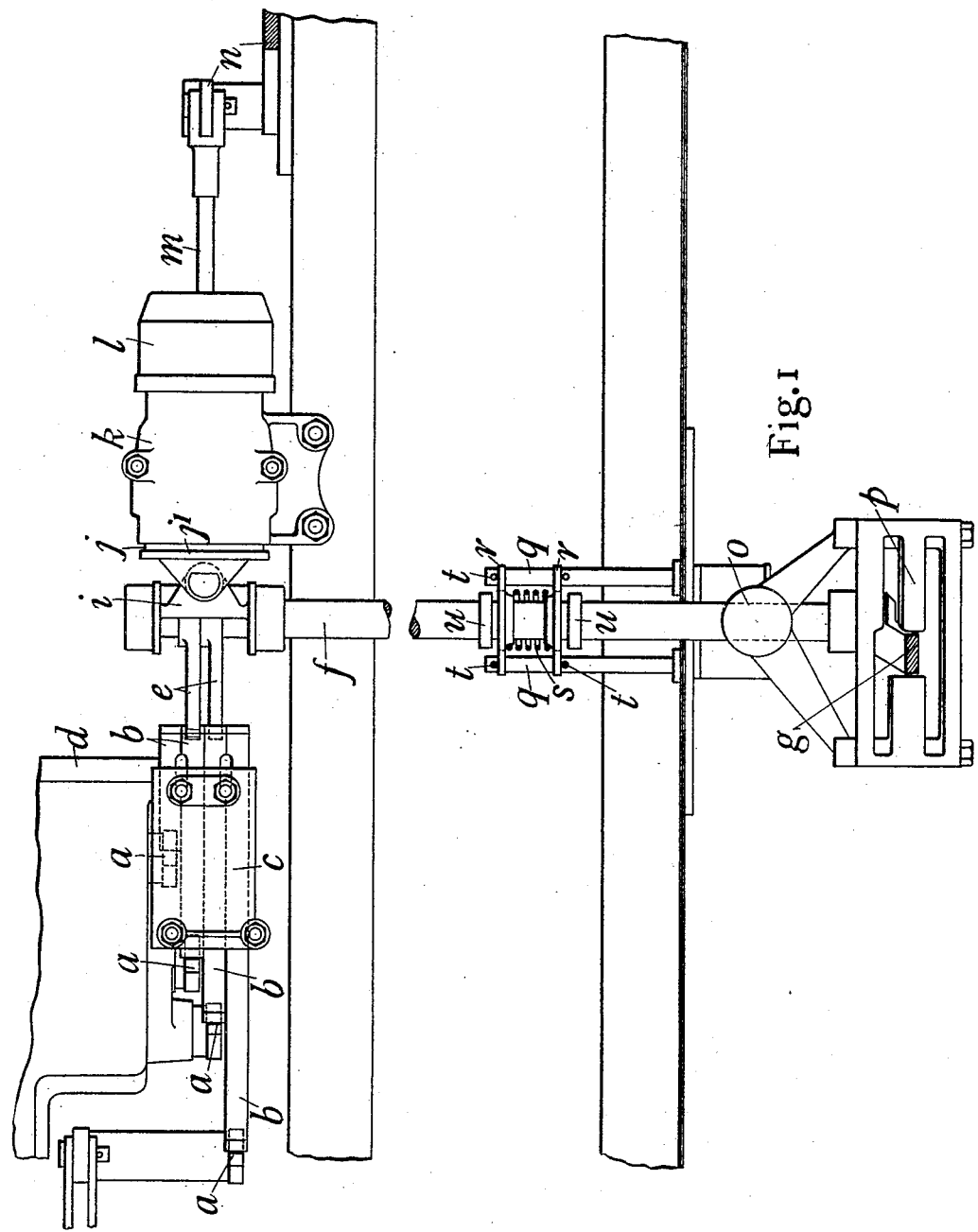

UNITED STATES PATENT OFFICE.

GEORGE HERBERT LANCHESTER, OF BIRMINGHAM, ENGLAND.

GEAR-ACTUATING MECHANISM FOR MOTOR-VEHICLES.

941,261.  Specification of Letters Patent. Patented Nov. 23, 1909.

Application filed April 9, 1909. Serial No. 488,961.

*To all whom it may concern:*

Be it known that I, GEORGE HERBERT LANCHESTER, subject of Great Britain, residing at Armourer Mills, Montgomery street, in the city of Birmingham, England, have invented certain new and useful Improvements Relating to Gear-Actuating Mechanism for Motor-Vehicles, of which the following is a specification.

This invention relates more especially to the actuation of epicyclic or like change speed gears for motor vehicles in which a number of frictional or other clutches are employed for putting the required gears into action.

The invention has for its object to arrange for the control of such gears by means of a hand lever and pedal involving similar operations so far as the driver is concerned as the sliding gears at present most commonly employed.

The invention comprises the provision in conjunction with the clutches of the gear, of a spring pedal device and a hand operated selecting and transmission piece or pieces, together with suitable clutch actuating thrust rods and levers or their equivalent, the arrangement being such that the selecting piece can be moved into alinement with one of the thrust rods or the like for the operation thereof by means of the spring or pedal.

Referring to the two accompanying sheets of explanatory drawings:—Figure 1 is a plan and Fig. 2 a side elevation of gear actuating mechanism constructed in accordance with this invention. Fig. 3 is a diagrammatic side elevation showing the spring pedal device in section.

The same reference letters in the different views indicate the same parts.

In carrying the invention into effect as illustrated for the control of epicyclic driving mechanism provided with friction clutches, each clutch has arranged therewith an actuating lever $a$. Adjacent to the levers are mounted a series of thrust rods $b$ which are supported parallel to each other in a suitable guide or bracket $c$ which is carried on the gear box $d$ or on any other convenient part. For operating the thrust rods selecting pieces $e$ are employed, such pieces serving to transmit motion from the pedal device hereinafter described. The selecting pieces are secured to a spindle $f$ to which both an angular or pivotal and an axial movement can be given by means of a hand lever $g$ arranged at the side of the vehicle. The shape and relative disposition of the said pieces are such that by a lateral or axial movement they can be moved freely past the ends of the thrust rods, and then by an appropriate angular movement one of the pieces can be brought into engagement with the particular thrust rod to be actuated. Preferably two selecting pieces are adopted, so that an angular movement in one direction puts one piece into operation and a like movement in the opposite direction puts the other piece into operation. To compensate for wear in, more especially, the clutches and consequent variation in the adjustment of the rods $b$ and levers $a$, the selecting pieces are made to a cam like or eccentric configuration.

To prevent or avoid actuation of the clutches by the hand lever $g$ and cams or selecting pieces $e$ the peripheries of the latter are notched and the adjacent ends of the thrust rods made to a chisel like or other equivalent configuration for engaging therewith. The notches are made sufficiently deep and with the edges suitably inclined to prevent the cams from being rotated far enough to actuate the clutches with the application of a normal operative force to the handle. Any looseness or freedom in the normal direction of motion of the rods $b$ or levers $a$ is, however, mainly taken up by the cams in order that the same or approximately the same pressure may be exerted on the rods by the pedal device under all conditions. Further the notches are such that when a cam has been advanced into the correct position a suitable clearance or freedom is provided between the same and the end of the adjacent thrust rod so that release of the clutch is always insured on the reverse actuation of the pedal despite any expansion, distortion or other cause whereby the adjustment of the parts can be affected. Thus, supposing the condition of the mechanism to be such that a certain amount of endwise movement can be given to one of the rods $b$ before the correponding clutch is actuated the greater part of the movement is taken up by one of the cams before the pedal device is put into action. But sufficient residual movement or freedom is left to insure that with the reverse operation of the pedal device the clutch will be fully released under the action of its own spring.

Only the selecting movements, or the lateral and angular movements aforesaid for putting the selecting pieces or cams into position, are effected by the hand lever e. The required rectilinear movements of the thrust bars for operating the clutches are produced by the pedal device. Such device comprises a spring h arranged to act upon the selecting piece spindle f through the medium of a suitable fitting i mounted on the said spindle and a cylindrical case j whereby the spring is for the greater part inclosed. The spring case is supported by a cylindrical guide k to one end of which is screwed an adjustable abutment l for the spring. Through the center of the spring passes a link m which is secured at one end to the spring case and at the other to a pedal lever n. To limit the axial movement of the part j relatively to the guide k, the former is provided with collars j' which respectively abut against the end of the guide and an internal shoulder as illustrated. In the drawings the spring device is shown in the mid position of its movement.

On depressing the pedal lever the spring is compressed and the selecting pieces are drawn back from the thrust rods so that one of the pieces can be put into position opposite the rod corresponding to the clutch to be operated. With the release of the pedal the spring expands and its motion is transmitted through the selecting piece and thrust rod to the operating lever of the clutch.

To permit the required movements of the selecting piece in the direction of the spring and thrust rods the selecting piece spindle is pivoted at o near to the handle. For determining the axial and angular movements of the spindle an ordinary slotted gate p is employed in conjunction with the handle, such gate being suitably mounted on the vehicle frame to permit the pivotal or other movement of the spindle under the action of the pedal and spring.

In order to insure the handle automatically taking up a position between the slots in the gate as shown when moved to the mid position, we mount on the chassis a pair of pins q carrying plates r between which is placed a spring s. Movement of the plates away from each other is limited by pegs t. On the spindle collars u are provided for abutment against the plates. With the movement of the handle into either of the slots in the gate the spring s is compressed, so that when the handle is brought into the mid position it is moved into the gap between the slots by the action of the spring. The plates are suitably slotted to permit the pivotal movement aforesaid of the spindle.

With the arrangement above described the operative movement required in the spring is constant and in consequence a constant operative pressure is transmitted to the actuating levers of the clutches. Such movement and pressure are independent of variation in adjustment of the clutches since the variation is compensated as aforesaid by the cam like selecting pieces. By the use of the notched selecting pieces I also insure that the operative movements of the clutches are effected by the pedal device only with the result that a greater reliability can be obtained.

It will be understood that instead of actuating the clutches from the spring they may be actuated by the pedal lever, the spring being then employed to effect the movement which in the former mechanism is effected by the pedal.

In a modification only one selecting piece may be adopted, while in a further modification three or more may be provided. The clutches with which the levers a are arranged in the illustrated form of my invention are not shown in the drawings as these form no part of the present invention and are the usual circumferential band brakes or clutches commonly employed with gears of the epicyclic type.

I claim:—

1. In actuating mechanism for motor vehicle change speed gears controlled by clutches, the combination comprising a clutch actuating lever, a thrust rod arranged in conjunction with said lever, a hand controlled transmission piece, and a spring pedal device adapted to operate the thrust rod through the medium of the transmission piece, substantially as described.

2. In actuating mechanism for motor vehicle change speed gears controlled by clutches, the combination comprising clutch actuating levers, thrust rods arranged in conjunction with said levers, hand controlled selecting and transmission pieces, and a spring pedal device adapted to operate the thrust rods through the medium of the transmission pieces, substantially as described.

3. In actuating mechanism for motor vehicle change speed gears controlled by clutches, the combination comprising clutch actuating levers, thrust rods arranged in conjunction with said levers, hand controlled oscillatory selecting and transmission pieces, and a spring pedal device adapted to operate the thrust rods through the medium of the transmission pieces, substantially as described.

4. In actuating mechanism for motor vehicle change speed gears controlled by clutches, the combination comprising clutch actuating levers, hand controlled oscillatory cam shaped and notched selecting and transmission pieces, thrust rods arranged in conjunction with the said levers and formed with ends capable of being engaged by the said notched transmission pieces, and a spring pedal device adapted to operate the thrust rods through the medium of the transmission pieces, substantially as described.

5. In actuating mechanism for motor vehicle change speed gears controlled by clutches, the combination comprising clutch actuating levers, thrust rods arranged in conjunction with said levers, a hand controlled oscillatory and laterally movable selecting and transmission piece, and a spring pedal device adapted to operate the thrust rods through the medium of the transmission piece, substantially as described.

6. In actuating mechanism for motor vehicle change speed gears controlled by clutches, the combination comprising clutch actuating levers, thrust rods arranged in conjunction with said levers, hand controlled oscillatory and laterally movable selecting and transmission pieces, and a spring pedal device adapted to operate the thrust rods through the medium of the transmission pieces, substantially as described.

7. In actuating mechanism for motor vehicle change speed gears controlled by clutches, the combination comprising clutch actuating levers, thrust rods arranged in conjunction with said levers, hand controlled oscillatory transmission and selecting pieces, a laterally movable shaft carrying said pieces, a hand lever connected to the shaft, and a spring pedal device adapted to operate the thrust rods through the medium of the transmission pieces, substantially as described.

8. In actuating mechanism for motor vehicle change speed gears controlled by clutches, the combination comprising clutch actuating levers, thrust rods arranged in conjunction with said levers, hand controlled oscillatory transmission and selecting pieces, a laterally and axially movable shaft carrying said pieces, a hand lever attached to the shaft, and a spring pedal device adapted to operate the thrust rods through the medium of the transmission pieces, substantially as described.

9. In actuating mechanism for motor vehicle change speed gears controlled by clutches, the combination comprising clutch actuating levers, thrust rods arranged in conjunction with said levers, hand controlled oscillatory transmission and selecting pieces, a laterally and axially movable shaft carrying said pieces, a hand lever attached to the shaft, and a spring pedal device connected to the shaft and adapted to operate the thrust rods through the medium of the transmission pieces, substantially as described.

10. In actuating mechanism for motor vehicle change speed gears controlled by clutches, the combination comprising clutch actuated levers, thrust rods arranged in conjunction with said levers, hand controlled oscillatory transmission and selecting pieces, a laterally movable shaft carrying said pieces, a hand lever attached to the shaft, a movable cylindrical element connected to the shaft, a fixed cylindrical guide supporting the said element, a spring contained by the said element and guide, a pedal lever, and a link connecting the pedal lever to the cylindrical element, substantially as described.

11. In actuating mechanism for motor vehicle change speed gears controlled by clutches, the combination comprising clutch actuating levers, thrust rods arranged in conjunction with said levers, hand controlled oscillatory transmission and selecting pieces, a laterally and axially movable shaft carrying said pieces, a hand lever attached to the shaft, a slotted gate in conjunction with the handle, and a spring controlled pedal device adapted to operate the thrust rods through the medium of the transmission pieces, substantially as described.

12. In actuating mechanism for motor vehicle change speed gears controlled by clutches, the combination comprising clutch actuating levers, thrust rods arranged in conjunction with said levers, a pair of cam shaped and notched oscillatory transmission and selecting pieces, a laterally and axially movable shaft carrying said pieces, a hand lever attached to the shaft, a slotted gate in conjunction with the handle, a movable cylindrical element connected to the shaft, a fixed cylindrical guide supporting the said element, a spring contained by the said element and guide, a pedal lever, and a link connecting the pedal lever to the cylindrical element, substantially as described.

In testimony whereof, I affix my signature in presence of two witnesses.

GEORGE HERBERT LANCHESTER.

Witnesses:
JOHN MORGAN,
HARRY DAVIS.